（12）United States Patent
Rousseau et al.

(10) Patent No.: US 11,137,019 B2
(45) Date of Patent: Oct. 5, 2021

(54) JOINT ASSEMBLY FOR MOTION SIMULATOR

(71) Applicant: D-BOX TECHNOLOGIES INC., Quebec (CA)

(72) Inventors: Robert Rousseau, Saint-Jean-sur-Richelieu (CA); Benoit Lupien, Varennes (CA); Steve Boulais, St-Jean-sur-Richelieu (CA); Jean-Francois Menard, Boucherville (CA)

(73) Assignee: D-BOX TECHNOLOGIES INC., Quebec (CA)

( * ) Notice: Subject to any disclaimer, the term of this patent is extended or adjusted under 35 U.S.C. 154(b) by 764 days.

(21) Appl. No.: 15/771,411

(22) PCT Filed: Oct. 31, 2016

(86) PCT No.: PCT/US2016/059696
§ 371 (c)(1),
(2) Date: Apr. 27, 2018

(87) PCT Pub. No.: WO2017/075579
PCT Pub. Date: May 4, 2017

(65) Prior Publication Data
US 2018/0320734 A1 Nov. 8, 2018

Related U.S. Application Data

(60) Provisional application No. 62/247,870, filed on Oct. 29, 2015.

(51) Int. Cl.
*F16C 11/08* (2006.01)
*F16C 11/06* (2006.01)
(Continued)

(52) U.S. Cl.
CPC .......... *F16C 11/08* (2013.01); *F16C 11/0647* (2013.01); *F16C 11/0685* (2013.01);
(Continued)

(58) Field of Classification Search
CPC ... F16C 11/08; F16C 11/0647; F16C 11/0685; F16C 11/083
See application file for complete search history.

(56) References Cited

U.S. PATENT DOCUMENTS 2,151,833 A * 3/1939 Bugatti ................. F16L 27/073
285/271
2,161,718 A * 6/1939 Miller ...................... G01C 5/02
248/182.1
(Continued)

OTHER PUBLICATIONS

International Search Report for corresponding application PCT/US2016/059696 filed Oct. 31, 2016; dated Jan. 17, 2017.
(Continued)

*Primary Examiner* — Daniel J Wiley
(74) *Attorney, Agent, or Firm* — Cantor Colburn LLP (57) ABSTRACT

A joint assembly between a first component and a second component comprises a ball portion configured to be connected to the first component. A socket is configured to be connected to the second component or ground and comprises a socket base, a socket cover, and a spherical joint cavity within the assembled socket base and socket cover to receive the ball portion to form a spherical joint. At least one biasing member is in the joint assembly. A clamp clamps the socket base to the socket cover such that the at least one biasing member biases the socket base and the socket cover toward one another.

19 Claims, 4 Drawing Sheets

(51) Int. Cl.
  *G09B 9/00* (2006.01)
  *G09B 9/12* (2006.01)

(52) U.S. Cl.
  CPC .............. *F16C 11/083* (2013.01); *G09B 9/00* (2013.01); *G09B 9/12* (2013.01); *F16C 11/0609* (2013.01); *F16C 11/0657* (2013.01); *F16C 11/0695* (2013.01); *F16C 2208/10* (2013.01); *F16C 2208/78* (2013.01); *F16C 2361/00* (2013.01)

(56) References Cited

U.S. PATENT DOCUMENTS

| | | | | |
|---|---|---|---|---|
| 2,328,135 A * | 8/1943 | Gack | ...................... | A47B 27/02 |
| | | | | 403/71 |
| 2,458,917 A * | 1/1949 | Prisco | ....................... | A47F 8/00 |
| | | | | 223/68 |
| 2,615,368 A * | 10/1952 | Bindley | .................... | B60R 1/04 |
| | | | | 248/481 |
| 2,652,221 A * | 9/1953 | Kampageorgel | ........ | B60R 1/078 |
| | | | | 248/276.1 |
| 3,220,755 A | 11/1965 | Gottschald | | |
| 3,627,339 A * | 12/1971 | Burweger | ............. | F16C 23/045 |
| | | | | 279/8 |
| 3,704,645 A * | 12/1972 | Grauso | .................... | G10G 5/00 |
| | | | | 84/421 |
| 4,140,413 A * | 2/1979 | Conrad | ..................... | F16D 1/09 |
| | | | | 279/16 |
| 4,227,826 A * | 10/1980 | Conrad | ..................... | F16D 1/09 |
| | | | | 279/16 |
| 4,917,527 A * | 4/1990 | Bollinger | .............. | F16C 11/106 |
| | | | | 403/141 |
| 4,974,802 A * | 12/1990 | Hendren | ................ | F16C 11/106 |
| | | | | 248/181.1 |
| 6,422,779 B1 | 7/2002 | Spagnuolo | | |
| 2003/0138289 A1* | 7/2003 | Ronsheim | .............. | F16C 11/106 |
| | | | | 403/90 |
| 2005/0220531 A1 | 10/2005 | Sellers | | |
| 2010/0232869 A1 | 9/2010 | Ditzler | | |
| 2012/0168593 A1 | 7/2012 | Mekid | | |

OTHER PUBLICATIONS

Written Opinion for corresponding application PCT/US2016/059696 filed Oct. 31, 2016; dated Jan. 17, 2017.

\* cited by examiner

JOINT ASSEMBLY FOR MOTION SIMULATOR

CROSS-REFERENCE TO RELATED APPLICATION

The present application claims the priority of U.S. Patent Application Ser. No. 62/247,870, filed on Oct. 29, 2015.

TECHNICAL FIELD

The present application relates to joint assembles of the type used in motion simulators.

BACKGROUND OF THE ART

Spherical joints are used in numerous applications as they enable multiple degrees of freedom of rotation between parts they join. In some specific applications, such as motion simulators, it is paramount that spherical joints provide as little play as possible in order to render vibro-kinetic movements accurately and precisely. This may be a challenge, considering that spherical joints typically include a ball that is surrounded by the surfaces of a socket. Hence, the socket must be constituted of interconnected components, which may lead to the presence of play between the ball and the socket. Also, considering the use of numerous components, it may be desired to create a joint assembly that is nonetheless easy to manufacture and easy to assemble, while resulting in a joint assembly that has a high resistance to pull forces.

SUMMARY

It is an aim of the present disclosure to provide a joint assembly that addresses issues associated with the prior art.

Therefore, in accordance with a first embodiment of the present disclosure, there is provided a joint assembly between a first component and a second component comprising: a ball portion configured to be connected to the first component; a socket configured to be connected to the second component or ground and comprising a socket base, a socket cover, a spherical joint cavity within the assembled socket base and socket cover to receive the ball portion to form a spherical joint; at least one biasing member in the joint assembly; and a clamp clamping the socket base to the socket cover such that the at least one biasing member biases the socket base and the socket cover toward one another.

Further in accordance with the first embodiment, the clamp includes in some instances a cap mounted onto the socket cover, and connected to the socket base, a translational joint being formed between the cap and the socket cover enabling biasing action of the socket cover toward the socket base.

Still further in accordance with the first embodiment, the cap includes in some instances at least one C-shaped clip contacting an annular surface of the socket base.

Still further in accordance with the first embodiment, the cap includes in some instances at least one fastener screwingly engaged to the at least one C-shaped clip.

Still further in accordance with the first embodiment, the at least one biasing member is in some instances between the clamp and the socket cover.

Still further in accordance with the first embodiment, the at least one biasing member is in some instances an elastomeric ring.

Still further in accordance with the first embodiment, the socket base consists in some instances of a monolithic piece of ultra-high-molecular-weight polyethylene.

Still further in accordance with the first embodiment, the socket cover consists in some instances of a monolithic piece of ultra-high-molecular-weight polyethylene.

Still further in accordance with the first embodiment, the ball portion is in some instances metallic.

Still further in accordance with the first embodiment, the socket cover has in some instances a countersink opening configured for allowing connection of the first component to the ball portion, wherein the countersink opening tapers toward the ball portion.

Still further in accordance with the first embodiment, a threaded rod is in some instances received in a threaded bore in the ball portion and projecting out of the spherical joint cavity through the countersink opening.

Still further in accordance with the first embodiment, the socket base has in some instances a flange at an end away from the spherical joint cavity, and further comprising a housing enclosing the flange to form a translation joint therewith.

In accordance with a second embodiment of the present disclosure, there is provided a motion simulator comprising: an output; at least one linear actuator between the output and a support structure; at least one joint assembly between the at least one linear actuator, and one of the output and the support structure, the joint assembly comprising a ball portion connected to either the at least one linear actuator, or one of the output and the support structure; a socket connected to either the at least one linear actuator, or one of the output and the support structure complementary to that connected to the ball portion, and comprising a socket base, a socket cover, a spherical joint cavity within the assembled socket base and socket cover to receive the ball portion to form a spherical joint, at least one biasing member in the joint assembly; and a clamp clamping the socket base to the socket cover such that the at least one biasing member biases the socket base and the socket cover toward one another.

Further in accordance with the second embodiment, the clamp includes in some instances a cap mounted onto the socket cover, and connected to the socket base, a translational joint being formed between the cap and the socket cover enabling biasing action of the socket cover toward the socket base.

Still further in accordance with the second embodiment, the cap includes in some instances at least one C-shaped clip contacting an annular surface of the socket base.

Still further in accordance with the second embodiment, the cap includes in some instances at least one fastener screwingly engaged to the at least one C-shaped clip.

Still further in accordance with the second embodiment, the at least one biasing member in some instances is between the clamp and the socket cover.

Still further in accordance with the second embodiment, the at least one biasing member is in some instances an elastomeric ring.

Still further in accordance with the second embodiment, the socket base consists in some instances of a monolithic piece of ultra-high-molecular-weight polyethylene.

Still further in accordance with the second embodiment, the socket top consists in some instances of a monolithic piece of ultra-high-molecular-weight polyethylene Still further in accordance with the second embodiment, the ball portion is in some instances metallic.

Still further in accordance with the second embodiment, the socket top has in some instances a countersink opening for connection with either the at least one linear actuator, or one of the output and the support structure, wherein the countersink opening tapers toward the ball portion.

Still further in accordance with the second embodiment, a threaded rod is in some instances received in a threaded bore in the ball portion and projecting out of the spherical joint cavity through the countersink opening.

Still further in accordance with the second embodiment, the socket base in some instances has a flange at an end away from the spherical joint cavity, and further comprising a housing enclosing the flange to form a translation joint therewith.

Still further in accordance with the second embodiment, the housing is in some instances connected to the support structure, the support structure being the floor.

In accordance with a third embodiment of the present disclosure, there is provided a method for forming a joint assembly comprising: positioning a ball in a spherical joint cavity of a socket defined between a socket base and a socket cover; positioning at least one biasing member between at least two of the socket base, the socket cover and a clamp; biasing the socket base and the socket cover toward one another by clamping the socket base and the socket cover against the action of the at least one biasing member; securing the ball to a first component and the socket to a second component or ground.

Further in accordance with the third embodiment, the clamp is a cap in some instances and further comprising positioning the cap onto the socket cover to form a translation joint therebetween enabling the biasing of the socket base and the socket cover toward one another.

Still further in accordance with the third embodiment, positioning the at least one biasing member between at least two of the socket base, the socket cover and the clamp comprises in some instances positioning the at least one biasing member between the cap and the socket cover.

Still further in accordance with the third embodiment, biasing the socket base and the socket cover toward one another comprises in some instances clamping at least one clip of the clamp at an end of the cap to an annular surface of the socket base.

Still further in accordance with the third embodiment, securing the ball to a first component comprises in some instances passing a threaded rod through a hole in the socket cover and inserting the threaded rod in a threaded bore in the ball.

Still further in accordance with the third embodiment, securing the socket to a second component or ground comprises in some instances inserting the socket base in a housing to form a translation joint relative to the ground.

Still further in accordance with the third embodiment, securing the ball to a first component and the socket to a second component or ground comprises in some instances securing the joint assembly to a motion simulator.

DETAILED DESCRIPTION

Figure 1:
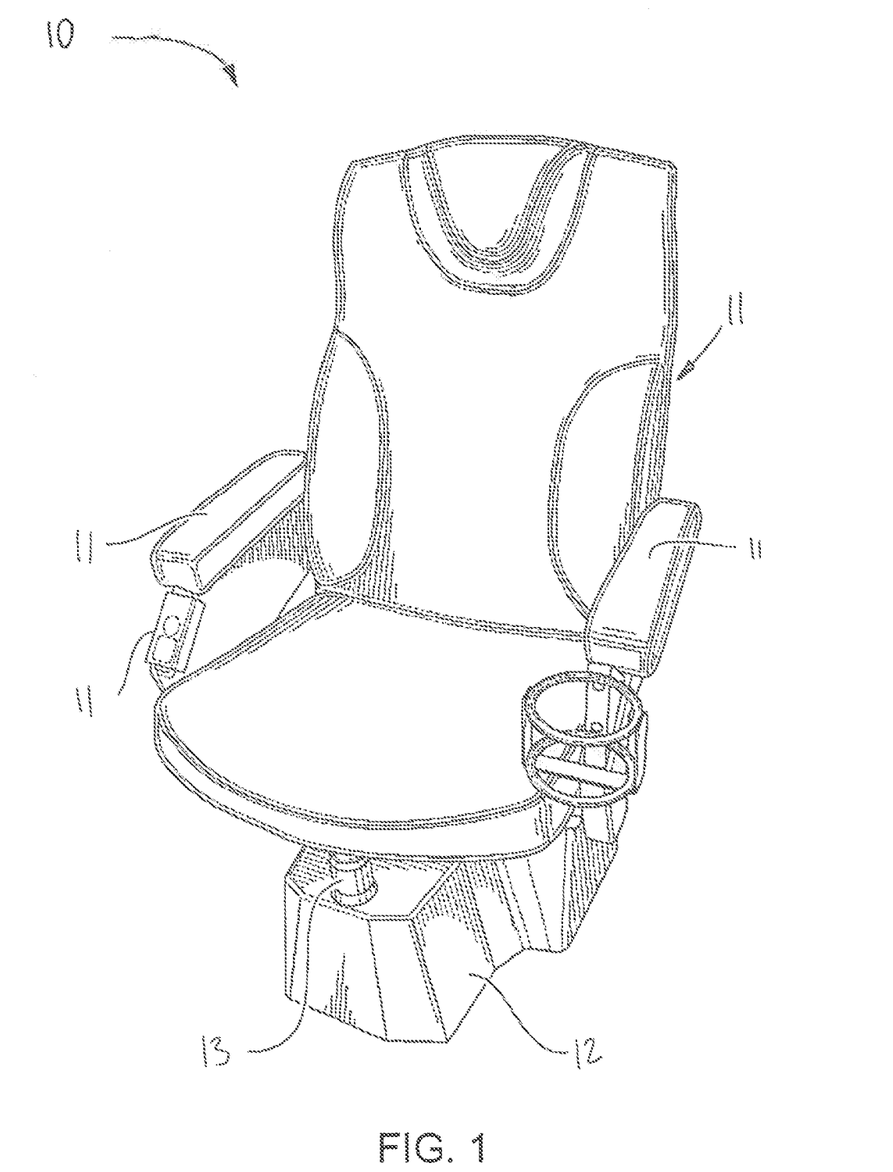
FIG. 1 is a perspective view of a motion simulator using joint assemblies in accordance with the present disclosure.

Referring to drawings and, more particularly, to FIG. 1, there is illustrated a motion simulator at 10. The motion simulator 10 is of the type that may receive actuation signals from a controller so as to move an output thereof in accordance with a set of movements. For example, the motion simulator 10 may be of the type that moves in synchronicity with video or audio output, with motion signals representative of movements to be performed being received from a controller. In the illustrated embodiment, the motion simulator 10 has a motion platform 11 supporting one or more occupants exposed to movements of the motion simulator 10. In the illustrated embodiment, the motion platform 11 is a seat having a seat portion 11 in which a user may be seated. Other occupant supporting structures may be included, but for simplicity the expression seat portion 11 will be used in the present application.

The seat portion 11 is shown as having armrests, a seat, and a backrest and this is one of numerous configurations considered, as the seat portion 11 could be for a single user, multiple users, may be a bench, etc. The motion simulator 10 also has an actuation system 12 by which the output, namely the seat portion 11, is supported to the ground. The actuation system 12 is shown as having a casing hiding its various components, although a linear actuator 13 is partly visible. The actuation system may have one or more of these linear actuators 13, supporting the output, i.e., the seat portion 11, from the ground. In an embodiment, the linear actuator 13 is an electro-mechanical actuator of the type having a ball-screw system, although other types of linear actuators may be used. Alternatively, a hydraulic or pneumatic cylinder could be used in lieu of the electro-mechanical linear actuator 13, for the motion simulator 10. The motion simulator 10 of FIG. 1 is one among numerous possible configurations for the motion simulator. For example, the motion simulator 10 may support a platform or structure instead of a seat portion, in a flight simulator embodiment, or an end effector in the case of a parallel manipulator or like robotic application.

Figure 3:
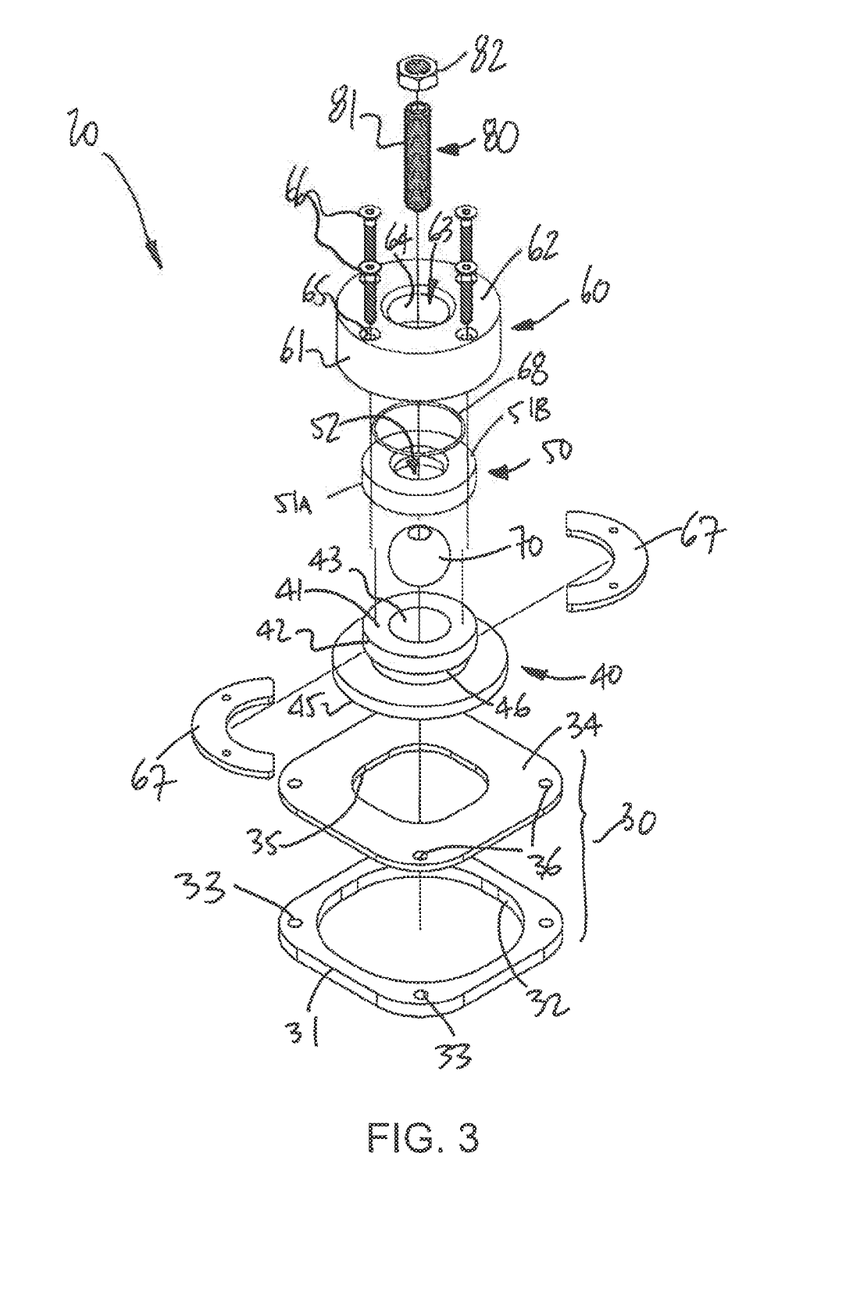
FIG. 3 is an exploded view of the joint assembly of FIG. 2.

One or more of the linear actuators 13 may have a joint assembly 20 as shown in FIG. 3 to be connected to the ground or to the seat portion 11 by way of appropriate fasteners. In an embodiment, the joint assembly 20 is positioned on the ground. It is, however, contemplated to provide this joint assembly 20 against the underside of the seat portion 11 or like output of the motion simulator 10, as in FIG. 1.

The joint assembly 20 may have a housing 30, a socket base 40, a floating socket cover 50 (e.g., forming the socket with the socket base 40), a cap 60, a ball 70, and a connector 80:

The housing 30 may be present in the joint assembly 20 to secure it to the ground, to an end of the linear actuator 13, or to the motion platform 11. The housing 30 may also form a translational joint, enabling one or two translational degrees of freedom (DOF) of movement as described hereinafter.

The socket base 40 forms a part of the socket in which the ball 70 will be received to form the spherical joint of the joint assembly 20. Moreover, the socket base 40 may form part of the translational joint with the housing 30. Furthermore, in an embodiment without the housing 30, the socket base 40 may be connected to the structure (e.g., motion platform or ground) or to an end of the linear actuator 13 or intermediate component.

The floating socket cover 50 is the other part of the socket in which the ball 70 will be received. It bears mentioning that the expressions base 40 and cover 50 are not intended to indicate that the base is always at the bottom and the cover is always on top during use, as this may not be the case, as detailed herein. The expression cover as the cover 50 may be installed onto the base 40 after the installation of the ball 70 in the base 40, although it is also contemplated to install the system with the ball 70 in the cover 50 first.

The clamp 60, e.g., a cap, cover or lid, sandwiches the socket base 40 and floating socket cover 50 onto the ball 70.

The ball 70 is received in the combination of the socket base 40 and the socket cover 50, and is the moving portion of the resulting spherical joint of the joint assembly 20.

The connector 80 is the interface between the ball 70 and an end of the linear actuator 13, intermediate component, or structure. Alternatively, the connector 80 may be an end of the rod or elongated screw shaft of the linear actuator 13, depending on the nature of the linear actuator 13.

Figure 2:
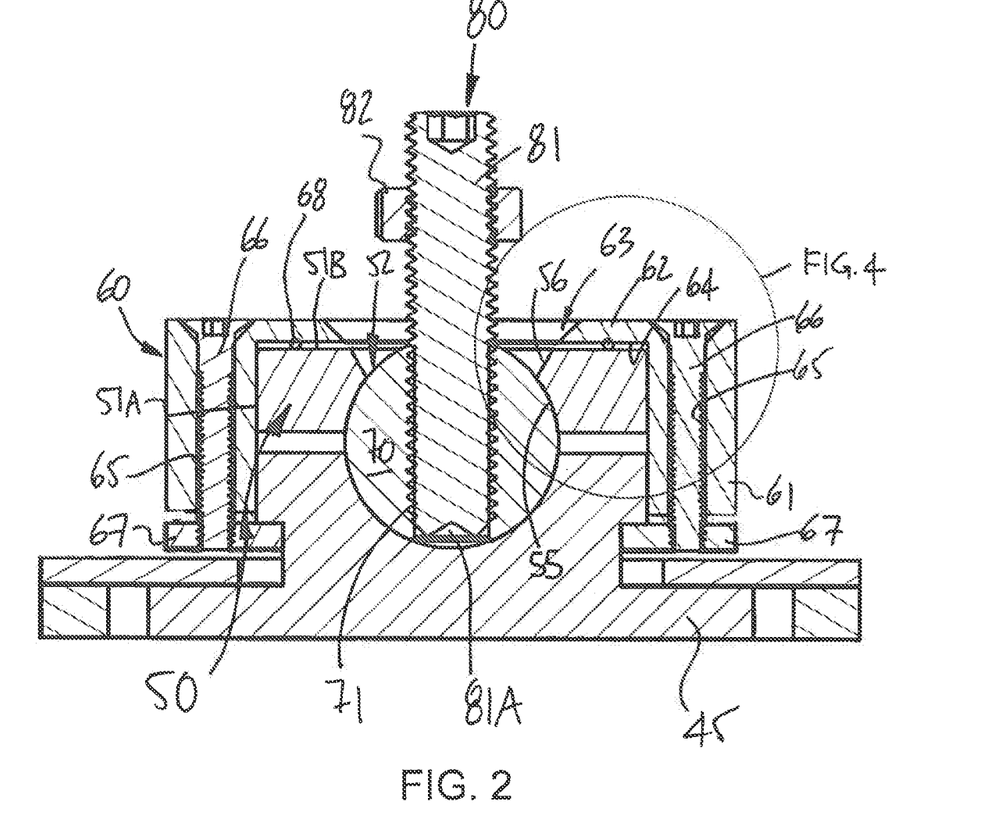
FIG. 2 is a section view of a joint assembly of the present disclosure.

Referring concurrently to FIGS. 2 and 3, the housing 30 is shown as having a baseplate 31. The baseplate 31 has a central bore 32. In the illustrated embodiment, the central bore 32 has an obround shape or similar oval or squircle shape. Other shapes are considered as well, including rectangular, spherical, circular, etc. Corner bores 33 are defined in the corners of the baseplate 31. A cap plate 34 is configured to be seated onto the baseplate 31. The cap plate 34 also has a central bore 35, but of smaller size than the central bore 32 of the baseplate 31. This configuration is provided so as to hold the socket base 40 captive therein, as detailed hereinafter. Corner bores 36 are defined in the corners of the cap plate 34, to be in register with the corner bores 33 of the baseplate 31 when one on top of the other. The corner bores 36 may be countersink bores. Accordingly, fasteners may pass through the corner bores 36 and 33 so as to secure the housing 30 to a support surface, such as the ground/floor, or an underside of the output 11.

The socket base 40 has a generally cylindrical body 41, with a flange 42 at an end thereof. The socket base 40 also has a central socket 43 formed into the body 41, at the end featuring the flange 42. The central socket 43 may be frusto-spherical, hemi-spherical or quasi hemi-spherical in shape. The central socket 43 therefore forms part of the spherical bearing surface against which the ball 70 will be received in sliding relation, for the ball 70 to rotate relative to the socket base 40, in up to three rotational DOFs.

Another flange 45 is provided at the opposed end of the socket base 40, whereby a neck 46 is defined by the cylindrical body 41 between the flanges 42 and 45. As shown in FIG. 2, the flange 45 has a thickness that is equivalent to the thickness of the baseplate 31 or slightly thinner. Accordingly, as shown in FIG. 2, the flange 45 may be received in the space bound by the ground (including any sliding plate on the ground), an inner surface of the central bore 32 of the baseplate 31, and a flat surface of the cap plate 34. Moreover, the dimension of the flange 45 is such that the socket base 40 is held captive in the housing 30, yet may move in a plane parallel to the cap plate 34 and hence in up to two translational DOFs. As the neck 46 is a reduction of diameter for the cylindrical body 41, it allows additional movement of the socket base 40 in the two translational DOFs before coming into abutment with a boundary of the central bore 35 in the cap plate 34. According to an embodiment, the socket base 40 is a monolithic piece made of a material with low friction properties, such as UHMW (i.e., ultra-high-molecular-weight polyethylene), although other materials (e.g., various types of metals or polymers) and other configurations can be used, such as a two-piece construction with metal base and low friction insert.

Although not shown, a bore may be defined in a bottom of the socket base 40, as an outlet for impurities. The bore may additionally have a hexagonal section (or other similar shape), for example to receive an Allen key for assembly purposes. As yet another alternative, with a large enough diameter, the bore may provide access to an end of the connector 80, for screwing or unscrewing it from the ball 70.

Figure 4:
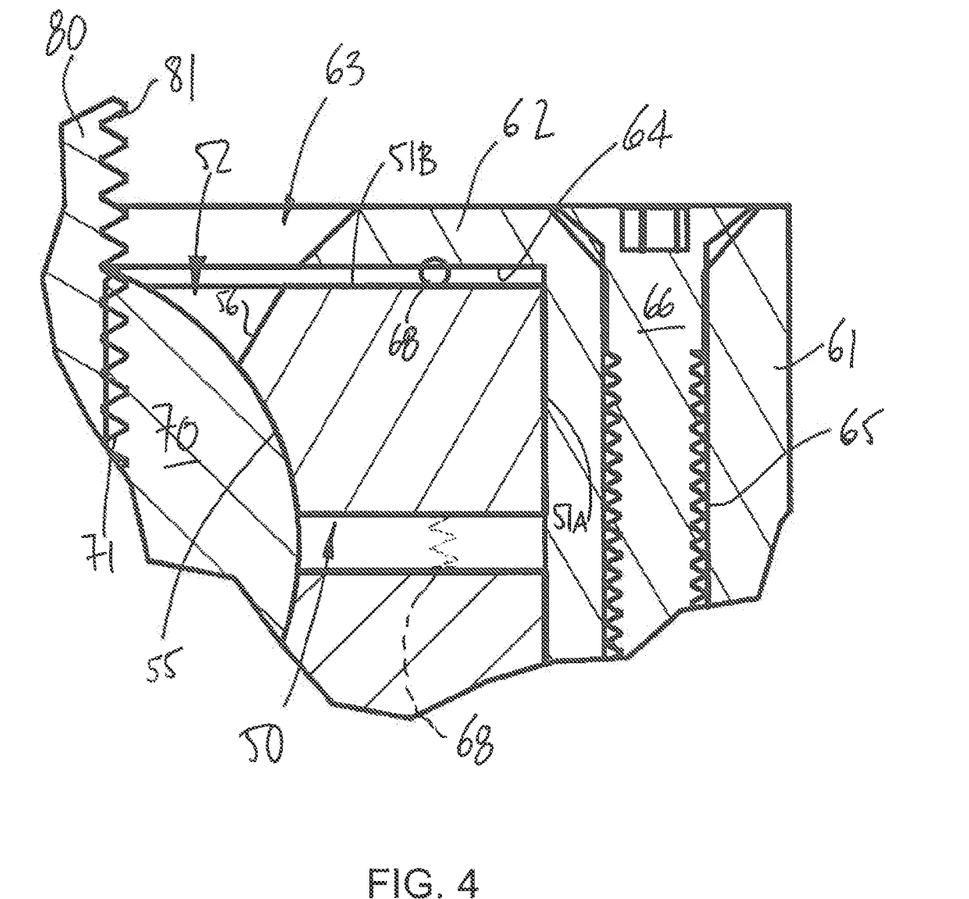
FIG. 4 is an enlarged section view showing a detail of a junction between a cap and a floating socket top of the joint assembly of FIG. 2.

Referring to FIGS. 2-3, the floating socket cover 50 has an annular body with an outer cylindrical surface 51A (among possibilities, as peripheral shapes other than circular are contemplated) and a top surface 51B. A through opening 52 is centrally positioned in the annular body. The through opening 52 is bound by a bearing surface 55 (FIGS. 2 and 4). The bearing surface 55 is generally frusto-spherical so as to be complementary to the surface of the ball 70. Finally, the through opening 52 may be bound by a flared section 56 (FIGS. 2 and 4) through which the ball 70 emerges along with the connector 80. When the socket cover 50 is assembled to the socket base 40 with the ball 70 therein, there is formed a spherical joint by which the ball 70 may move in up to three rotational DOFs. According to an embodiment, the socket cover 50 is a monolithic piece made of a material with low friction properties, such as UHMW (i.e., ultra-high-molecular-weight polyethylene), although other materials (e.g., various types of metals or polymers). The socket base 40 and the socket cover 50 may conveniently consist of the same material.

The floating socket cover 50 is said to be floating in that it is not anchored to any other component, but is instead held captive in the position shown in FIGS. 2 and 4, by being biased against the ball 70 by the action of the clamp 60, referred to as cap 60 based on the illustrated embodiment. In other words, the socket cover 50 may translate relative to the socket base 40, but is biased to remain in contact with the ball 70. In order to assist in pressing the floating socket cover 50 against the ball 70, the cap 60 latches onto or clamps to the socket base 40. Referring to FIGS. 2-4, the cap 60 has an annular body 61 with an inwardly projecting wall 62 having a through opening 63 at an end thereof (for example with a countersink shape or other shape such as a straight cylindrical shape). Accordingly, an inverted counterbore-like inner cavity 64 is defined by the cap 60, and is oriented toward the socket base 40 when the joint assembly 20 is assembled. Fasteners bores 65 are circumferentially-distributed in the annular body 61, and extend through it. For practicality, the fasteners bores 65 may be countersunk at an end, to receive appropriate fasteners 66.

The fasteners 66 are sufficiently long to project beyond the annular body 61, so as to connect to C-shaped clips 67. In the illustrated embodiment, a pair of the fasteners 66 is used for each of the clips 67, with the assembly employing two of the clips 67. Other configurations are considered, such as using a single C clip of more or less 270 degrees, more than a pair of clips 67, or a single fastener 66 or more than two fasteners 66 per clip 67. It is also considered to use straight tabs or other retainer shapes for the clips 67, as alternatives to the C-shape illustrated in the figures. As observed from FIGS. 2 and 3, the clips 67 are used instead of a single ring, as they will be fitted between the flanges 42 and 45, and thus against the neck 46, to attach the cap 60 to the socket base 40. However, in an embodiment, the socket base 40 is without a flange 45 to be connected directly to a structure (seat or ground), whereby a single ring could be used instead of a numerous clips 67. Also, a gap may be provided between the clips 67 and an edge surface of the annular body 61, with the screwing of the fasteners 66 reducing or augmenting the gap. The gap may be absent as well, with the clips 67 abutting the edge surface of the annular body 61 in such a way that a clearance is present between the top surface 51B of the socket cover 50 and a facing surface of the inwardly projecting wall 62, to allow translational movement of the floating cover 50 in the cap 60. Other clamps that could be used include jaws, pliers, etc to bring the socket cover 50 toward the socket base 40.

The floating is performing by the following assembly: The inner cavity 64 is dimensioned to allow substantially no or negligible lateral play when slid onto the flange 42 of the socket base 40, in a plane of the flange 42 (i.e., to which an axis of the annular body 61 is normal). Likewise, the outer cylindrical surface 51A of the floating socket cover 50 is sized to as to be snuggly received in the inner cavity 64, again with no or negligible lateral play, but with axial sliding movement permissible, thereby resulting in a translational joint. As shown in FIG. 2, a biasing member 68 is lodged between the projecting wall 62 and the top surface 51B of the floating socket cover 50. The annular body 61 is sized such that, when the clips 67 clamp the components together in the manner shown in FIG. 2, the biasing member 68 is elastically deformed to bias the floating socket cover 50 against the ball 70. As the socket cover 50 floats, i.e., is allowed to move axially within the annular body 61, the biasing of the biasing member 68 will cause the socket cover 50 to press against the ball 70, thereby forming the spherical joint.

According to the illustrated embodiment, the biasing member 68 is an elastomer ring, such as an O-ring, an annular seal, etc, made of rubber, or of any appropriate type of polymers. To increase the pressing action, additional biasing members 68 could be used, such as other ring elastomers (e.g., in concentric relation). Leaf springs, coil springs, etc, for example made of a metal, could also be used as biasing members 68, among numerous possibilities. It bears mentioning that the clips 67 are made of a rigid material (e.g., steel) that is chosen so as not to deform when the biasing member 68 is in its elastic deformation phase. It is the size of the gap between the annular edge surface of the annular body 61 and the clips 67 that enable an increase or decrease in the biasing action by augmenting or lessening the pressure applied on the biasing member 68. The biasing member 68 may be located elsewhere, such as between the socket base 40 and the floating socket cover 50 (FIG. 4), among other possibilities. In such a case, the biasing member 68 would be a tension spring pulling the floating socket cover 50 toward the socket base 40, with a gap between the floating socket cover 50 and the cap 60 to allow translational movement as explained above. Another contemplated arrangement uses the fasteners 66 for the biasing action: a compression coil spring may be positioned around one or more of the fasteners 66 to exert a compressive action between the head of the fastener(s) 66 and an abutment surface of a counterbore lodging the compression coil spring. In some of the embodiments described above, the socket cover 50 may be connected directly to the fasteners 66 (part of the clamp 60), without the presence of the cap 60. The cap 60 however conceals the gap between the socket base 40 and the socket cover 50, and this may reduce the exposure of the ball joint to contaminants, and form a protective barrier.

Referring to FIGS. 2 and 3, the ball 70 has a tapped bore 71. Therefore, the connector 80, with its threaded body 81, may be screwed into the tapped bore 71, for instance using the hexagonal socket 81A at the end of the threaded body 81. A nut 82 may be provided on the threaded body 81 as an example of components that may be attached to the connector 80. Any appropriate way by which the ball 70 may be connected to the linear actuator or to a structure is considered. For example, a rod end may be screwed directly into the tapped bore 71 of the ball 70. It is also observed that the ball 70 is not a full ball, notably because of the presence of the tapped bore 71. Nonetheless, the expression ball 70 is known to encompass ball portions (as opposed to a complete ball) or substantially spherical protuberance or protuberances.

While the assembly of the ball 70 in its socket formed by the socket base 40 and socket cover 50 allows movement of the ball 70 in three rotational DOFs, there may be constraints in movements of the ball 70 caused by the component to which it is connected, limiting movement to fewer than the three rotational DOFs. Likewise, in an embodiment of the assembly 20 with the translational DOFs of the housing 30, there may be constraints in movements of the socket base 40 in the housing 30 caused by the component to which the ball 30 is connected, limiting movement to fewer than the two translational DOFs.

During installation, the following sequence of actions may be executed. Firstly, if the assembly 20 features a housing 30, the socket base 40 is installed into the housing 30. This may be effected by positioning the socket base 40 in the base plate 31, and then seating the cap plate 34 onto the base plate 31 to hold the socket base 40 captive therebetween, via its flange 45. The housing 30 may then be fastened to the appropriate structure, such as the ground, floor, seat underside, platform, using fasteners such as screws. Alternatively, the socket base 40 could be secured directly to the appropriate structure in an embodiment without the housing 30. In such a case, the flange 45 may have fastener bores.

The ball 70 may then be inserted in the socket base 40, for example with the connector 80 screwed into it. The floating socket cover 50 and the cap 60 are then slid into engagement with the socket base 40, with the biasing member 68 between the socket cover 50 and the cap 60. This latter step may be performed according to any appropriate substep sequence. The clips 67 are then installed at a bottom of the annular body 61 of the cap 60, and as the fasteners 66 are tightened, the overall assembly of the base 40, the cover 50 and the cap 60 loses its axial play, such that the biasing member 68 is compressed. As a result, the socket cover 50 is pressed against the ball 70 to create the spherical joint. The ball 70, with or without the connector 80, may then be connected to the seat, ground or any other selected structural component.

In the illustrated embodiment, the socket base 40 and the socket cover 50 are illustrated as being monolithic components to interact directly with the ball 70, made of a material other than that of the base 40 and cover 50. As mentioned above, they may hence consist of a low-friction material such as UHMW polyethylene, while the ball 70 is made of a metal, such as aluminum. However, it may be ineffective to screw the cap 60 to the socket base 40, whereby the embodiment with fasteners 66 and clips 67 overcomes such ineffectiveness.

However, according to another embodiment, the cap 60 could alternatively be screwed directly to the flange 42 of the socket base 40. In such an embodiment, threading of any appropriate type may be provided on the circumferential surface of the cylindrical body 41. In such an embodiment, the threading would be selected as having a relatively small pitch, to have more threads per axial distance as would a coarse thread. In this way, suitable tearing resistance would be provided for the cap 60. Moreover, a fine thread is known to cause a lesser axial displacement per rotation than a coarse thread, this facilitating the adjustment of the tightening of the socket cover 50 relative to the socket base 40. Hence, although the socket base 40 is illustrated as being a monolithic component, it is contemplated to have the socket base 40 be an assembly of various components to enable effective screwing engagement with the cap 60. For example, the socket base 40 could have receptacle shells of a metal receiving therein an insert forming the bearing surfaces. In such a case, the receptacle shells could be made of a metal and provide the threading engagement between the socket base 40 and the cap 60, while the inserts defining the bearing surfaces could consist of a material with a lower coefficient of friction, such as Iglide® material of UHMW polyethylene. Other arrangements are also considered.

As yet another embodiment, the socket base 40, socket cover 50 and cap 60 are shown as being cylindrical, and thus as having a circular section. However, it is contemplated to provide or machine flat surfaces on the outer surface of the socket base 40, socket cover 50 and cap 60. Such flat surfaces could be used with tools, to screw and unscrew the socket base 40 to/from the socket cap 60.

While the methods and systems described herein have been described and shown with reference to particular steps performed in a particular order, it will be understood that these steps may be combined, subdivided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims. For instance, the joint assembly 20 need not be part of a motion simulator, and may interconnect two components that are not actuated. The expression spherical joint is used to suggest that at least one rotational degree of freedom may be present, although more degrees of freedom may be present.

The invention claimed is:

1. A joint assembly between a first component and a second component comprising:
   a ball portion configured to be connected to the first component;
   a socket configured to be connected to the second component or ground and comprising
      a socket base,
      a socket cover,
      a spherical joint cavity within the assembled socket base and socket cover to receive the ball portion to form a spherical joint;
   at least one biasing member in the joint assembly; and
   a clamp clamping the socket base to the socket cover such that the at least one biasing member biases the socket base and the socket cover toward one another.

2. The joint assembly according to claim 1, wherein the clamp includes a cap mounted onto the socket cover, and connected to the socket base, a translational joint being formed between the cap and the socket cover enabling biasing action of the socket cover toward the socket base.

3. The joint assembly according to claim 2, wherein the cap includes at least one C-shaped clip contacting an annular surface of the socket base.

4. The joint assembly according to claim 3, wherein the cap includes at least one fastener screwingly engaged to the at least one C-shaped clip.

5. The joint assembly according to claim 1, wherein the at least one biasing member is between the clamp and the socket cover.

6. The joint assembly according to claim 1, wherein the at least one biasing member is an elastomeric ring.

7. The joint assembly according to claim 1, wherein the socket cover has a countersink opening configured for allowing connection of the first component to the ball portion, wherein the countersink opening tapers toward the ball portion.

8. The joint assembly according to claim 7, further comprising a threaded rod received in a threaded bore in the ball portion and projecting out of the spherical joint cavity through the countersink opening.

9. The joint assembly according to claim 1, wherein the socket base has a flange at an end away from the spherical joint cavity, and further comprising a housing enclosing the flange to form a translation joint therewith.

10. A motion simulator comprising:
    an output;
    at least one linear actuator between the output and a support structure;
    at least one joint assembly between the at least one linear actuator, and one of the output and the support structure, the joint assembly comprising
       a ball portion connected to either the at least one linear actuator, or one of the output and the support structure;
       a socket connected to either the at least one linear actuator, or one of the output and the support structure complementary to that connected to the ball portion, and comprising
          a socket base,
          a socket cover, and
          a spherical joint cavity within the assembled socket base and socket cover to receive the ball portion to form a spherical joint;
       at least one biasing member in the joint assembly; and
       a clamp clamping the socket base to the socket cover such that the at least one biasing member biases the socket base and the socket cover toward one another.

11. The motion simulator according to claim 10, wherein the clamp includes a cap mounted onto the socket cover, and connected to the socket base, a translational joint being formed between the cap and the socket cover enabling biasing action of the socket cover toward the socket base.

12. The motion simulator according to claim 11, wherein the cap includes at least one C-shaped clip contacting an annular surface of the socket base.

13. The motion simulator according to claim 12, wherein the cap includes at least one fastener screwingly engaged to the at least one C-shaped clip.

14. The motion simulator according to claim 10, wherein the at least one biasing member is between the clamp and the socket cover.

15. The motion simulator according to claim 10, wherein the at least one biasing member is an elastomeric ring.

16. The motion simulator according to claim 10, wherein the socket cover has a countersink opening for connection with either the at least one linear actuator, or one of the output and the support structure, wherein the countersink opening tapers toward the ball portion.

17. The motion simulator according to claim 16, further comprising a threaded rod received in a threaded bore in the ball portion and projecting out of the spherical joint cavity through the countersink opening.

18. The motion simulator according to claim 10, wherein the socket base has a flange at an end away from the spherical joint cavity, and further comprising a housing enclosing the flange to form a translation joint therewith.

19. The motion simulator according to claim 18, wherein the housing is connected to the support structure, the support structure being the floor.

\* \* \* \* \*